(12) United States Patent
Tsai et al.

(10) Patent No.: US 9,839,876 B2
(45) Date of Patent: Dec. 12, 2017

(54) AIR CLEANING DEVICE USING WATER AS FILTER

(71) Applicants: Tsung-Hsin Tsai, Kaohsiung (TW); I-Ta Tsai, Kaohsiung (TW)

(72) Inventors: Tsung-Hsin Tsai, Kaohsiung (TW); I-Ta Tsai, Kaohsiung (TW)

( * ) Notice: Subject to any disclaimer, the term of this patent is extended or adjusted under 35 U.S.C. 154(b) by 221 days.

(21) Appl. No.: 14/833,553

(22) Filed: Aug. 24, 2015

(65) Prior Publication Data
US 2017/0056819 A1  Mar. 2, 2017

(51) Int. Cl.
*B01D 53/00* (2006.01)
*B01D 53/79* (2006.01)
*B01D 47/02* (2006.01)
*B01D 53/72* (2006.01)

(52) U.S. Cl.
CPC .......... *B01D 53/79* (2013.01); *B01D 47/021* (2013.01); *B01D 53/72* (2013.01); *B01D 2252/103* (2013.01); *B01D 2257/502* (2013.01); *B01D 2257/504* (2013.01); *B01D 2257/80* (2013.01); *B01D 2257/90* (2013.01); *B01D 2257/91* (2013.01); *B01D 2258/06* (2013.01); *B01D 2259/455* (2013.01); *B01D 2259/4508* (2013.01)

(58) Field of Classification Search
CPC .. B01D 47/10; B01D 53/185; B01D 53/1493; B01D 2253/103; B01D 53/78; B01D 53/52; B01F 3/04
See application file for complete search history.

(56) References Cited

U.S. PATENT DOCUMENTS

| 6,641,635 | B1 * | 11/2003 | Chiesl | B01D 47/06 454/187 |
| 6,966,942 | B2 * | 11/2005 | Broadbent | B01D 47/16 95/154 |
| 2012/0224994 | A1 * | 9/2012 | Steiner | A61L 9/02 422/3 |

FOREIGN PATENT DOCUMENTS

| CN | 103933832 A | * | 7/2014 |
| TW | 352007 | | 2/1999 |
| TW | 201041642 | | 12/2010 |

* cited by examiner

*Primary Examiner* — Amber R Orlando
*Assistant Examiner* — Stephen Hobson
(74) *Attorney, Agent, or Firm* — Muncy, Geissler, Olds & Lowe, P.C.

(57) ABSTRACT

An air cleaning device using water as a filter comprises a water tank, a water pump, a pressure equalizer and air-inhale tubes. The water tank includes an accommodation space for containing water, air inlets and air outlets. A cover hoods the water tank and has a water storage tank and air inlets. The water pump is disposed inside the water tank and connected with the pressure equalizer. Jet pipes of the pressure equalizer respectively interconnect with the air inlets through the air-inhale tubes. The water pump sucks the water in the accommodation space. Through the air-inhale tubes, the jet pipes inhale air in a jet fashion from exterior of the air inlets disposed in multiple directions. The air cleaning device can filter out the impurities in the air and fast clean the air of a large space. The present invention uses water as the filter and favors environmental protection.

9 Claims, 10 Drawing Sheets

AIR CLEANING DEVICE USING WATER AS FILTER

FIELD OF THE INVENTION

The present invention relates to an air cleaning device, particularly to an air cleaning device using water as a filter.

BACKGROUND OF THE INVENTION

In an investigation of the Environmental Protection Administration, it is found that household (indoor) air pollution is higher than outdoor air pollution by several times to tens of times. Air pollution is likely to cause pulmonary allergy or asthma. Therefore, many families purchase air cleaners to improve the quality of indoor air.

A common air cleaner uses an electric fan to suck and exhaust air, wherein several filters are arranged before the electric fan, and wherein the blades of the electric fan are driven by a motor to rotate at a high speed to suck air into the air cleaner, whereby the particles suspended in the air is filtered out by the filters. However, the filters cannot completely filter very tiny particles suspended in the air. Therefore, a common air cleaner cannot solve but can only soothe the problem of allergy. Besides, filters need replacing frequently to maintain the highest efficiency of the air cleaner, which would raise household expenditure. Further, dirt and particles are likely to adhere to filters and blades, which may cause noise, impair air suction, and increase power consumption.

Figure 1:
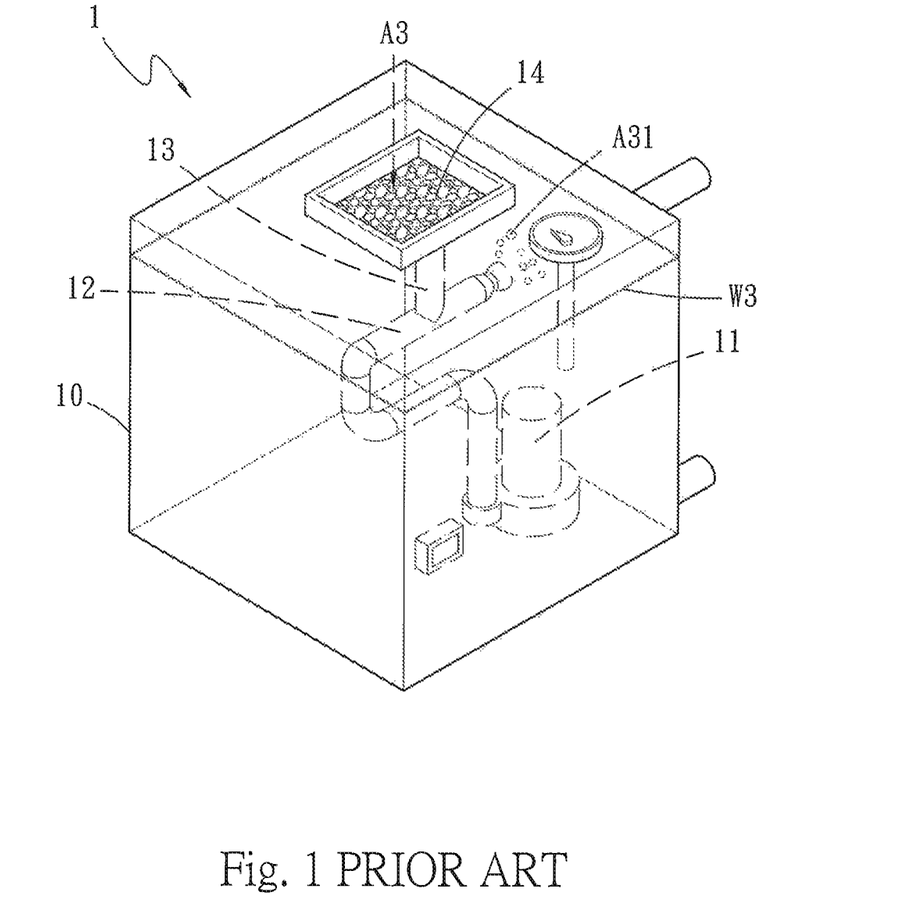
FIG. 1 is a diagram schematically showing a conventional water-circulation air cleaning device for absorbing hydrogen sulfide.

There have been air-cleaning devices using water to filter and purify air available in the market. For an example, Taiwan patent publication No. 201041642 disclosed a water-circulation air cleaning device for absorbing hydrogen sulfide. Refer to FIG. 1. The prior-art air cleaning device 1 comprises a water tank 10, a pump 11, a venturi tube 12, a side pipe 13, a guiding and filtering device 14, an ion concentration monitoring device and a timer. The pump 11 sends out water W3, and the venturi tube 12 accelerates water W3, whereby pressure drop is formed in the venturi tube 12. Next, the side pipe 13 sucks air A3 into water W3. Next, air A3 is mixed with water W3, and hydrogen sulfide is dissolved in water W3. Then, hydrogen sulfide is removed from air A3, and clean air A31 is obtained. However, the prior art has a problem: clean air A31 cannot be exhausted from the water tank 10 but is persistently accumulated in the water tank 10. Excessively accumulated clean air A31 will gradually decrease the amount of water W3 that the pump 11 can pump from the water tank 10 and finally make the venturi tube 12 unable to suck air A3. Thus, the air-water mixing and air cleaning function of the air cleaning device is disabled.

Figure 2:
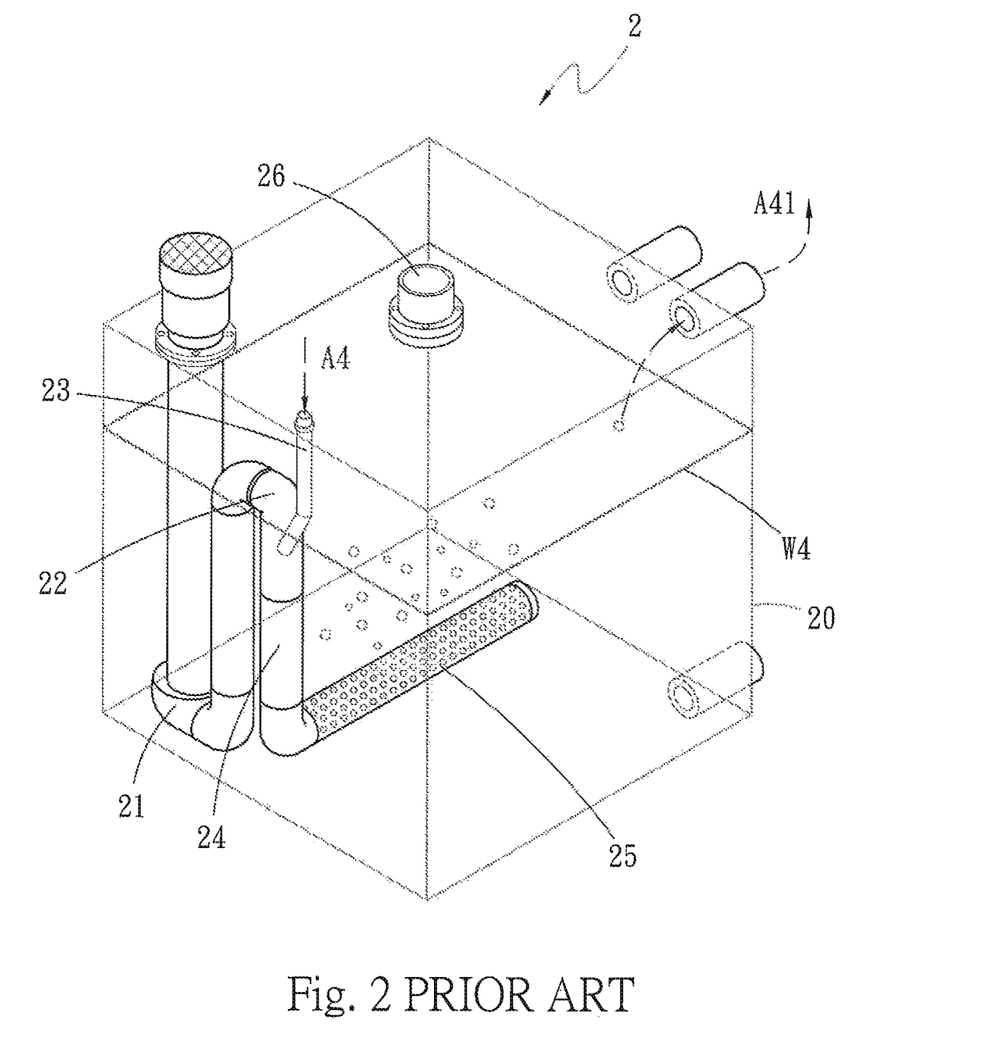
FIG. 2 is a diagram schematically showing a conventional waste gas processing device using a venturi tube-based gas cleaning tower.

For another example, Taiwan patent No. 352007 disclosed a waste gas processing device using a venturi tube-based gas cleaning tower. Refer to FIG. 2. In the prior-art waste gas processing device 2, a pump 21 cyclically pumps an absorbing liquid W4; a venturi tube-based vacuum sucker 23 bypassed from a main pipe 22 sucks waste gas A4 to contact and mix with the absorbing liquid W4 in the gas cleaning tower, whereby the waste gas A4 is atomized into bubbles in the absorbing liquid W4. Next, a static agitation pipe 24 thoroughly mixes the liquid and the gas. Next, the mixture of gas and liquid is injected from an aeration pipe 25 in a water tank 20, whereby the dust in the waste gas A4 is captured by the absorbing liquid W4 of the gas cleaning tower and deposits in the water tank 20. Then, clean air A41 is exhausted from an exhaust pipe 26. Thus, the waste gas A4 is purified. However, there are two factors impairing household application of the prior art: only a single set of the venturi tube-based vacuum sucker 23 is hard to suck sufficient waste gas A4 for effectively purifying the waste gas A4; the absorbing liquid W4 of the gas cleaning tower needs manually replacing frequently.

SUMMARY OF THE INVENTION

One objective of the present invention is to provide an air cleaning device using water as a filter, which is based on a jet theory, wherein water is pumped into a plurality of jet pipes to suck the air above a water tank from a plurality of air inlets and filter the air, whereby the air in a wide area is fast cleaned, and whereby effective convection and high substitution rate of the air is achieved.

To achieve the abovementioned objective, the present invention proposes an air cleaning device using water as a filter, which comprises a water tank, a water pump, a pressure equalizer, a plurality of air-inhale tubes, a cover, and an overflow container. The water tank has an accommodation space for containing water. The top of the accommodation space of the water tank has an opening. The upper region of the water tank has a plurality of air inlets and a plurality of air outlets, which interconnect with the accommodation space. A drainage hole interconnecting with the accommodation space is formed on a position below the air inlets and the air outlets. The water pump is disposed in a lower region of the accommodation space of the water tank and connected with the pressure equalizer. The pressure equalizer has a pressure equalization chamber thereinside and a plurality of jet pipes on the surface thereof. The pressure equalization chamber interconnects with the interior of the water pump and the jet pipes. Two ends of each air-inhale tube respectively interconnect with one air inlet and one jet pipe. The cover corresponds to the opening and hoods the top of the water tank. The cover has a water storage tank and a plurality of air inlets identical to those of the water tank. The air inlets of the cover respectively interconnect with the jet pipes through the air-inhale tubes. The bottom of the water storage tank 81 is connected with a water-input pipe extending into the water of the accommodation space. The overflow container is disposed corresponding to the drainage hole and receives the water overflowing out of the drainage hole.

Via the abovementioned technical scheme, the air cleaning device using water as a filter of the present invention has the following advantages:

1. The present invention mix air and water to irreversibly absorb bacteria and suspended particulates in the air and thus filter out bacteria and suspended particulates carried by the air, whereby is improved air quality and inhibited spread of infectious diseases. Further, the carbon dioxide in the air is partially dissolved in the water, whereby is achieved a carbon reduction effect.

2. The present invention makes air violently collide with water inside the jet pipes and release clean air containing natural anions. The clean air is released from the air outlets and mixed convectionally with the ambient air containing odors, smoke particles, dust and bacteria, whereby the ambient air is diluted by the clean air. Thus, the air quality is improved, the discomfort caused by polluted air is decreased, and the body is refreshed to a healthy state.

3. The present invention adopts a submersible pump, which is always being cooled by water and less likely to overheat, burn, or explode in long-term usage. Further, underwater operation can reduce the noise emitted to the air by the pump.

4. The level of the water in the accommodation space is flush with the drainage hole. The operation of the water pump generates turbulence in the water of the accommodation space. The turbulence makes a portion of water overflow out of the drainage hole and received by the overflow container. The water storage tank is activated by the drop in hydraulic pressure to replenish the accommodation space with clean water, whereby clean water will be automatically supplied to the water tank to maintain cleanness of the water filter. Further, the clean water can be common clear water or antiseptic water, such as saline water or medicinal water, which is cheap, easily acquired, and environment-friendly.

5. The present invention adopts a plurality of jet pipes. The function of the air cleaning device would not be affected by a blocked or damaged jet pipe because the other jet pipes are still working normally.

6. The present invention equips a plurality of rollers in lower regions of the air cleaning device. Thereby, the air cleaning device can be moved to anywhere anytime to clean the air of any place. The extension tube of the air cleaning device can function like a dust collector to intensively suck dust and air of a special location. While applied to a bathroom, the extension tube can be used to absorb the humidity in the bathroom and remove the water accumulated on the ground lest water causes someone to slip, whereby environmental safety is improved.

DETAILED DESCRIPTION OF THE PREFERRED EMBODIMENTS

Below, embodiments are described in detail in cooperation with attached drawings to make easily understand the objectives, technical contents, characteristics and accomplishments of the present invention. Before the detailed description of the present invention, it should be noted: like elements are denoted by like numerals thereinafter.

Figure 3:
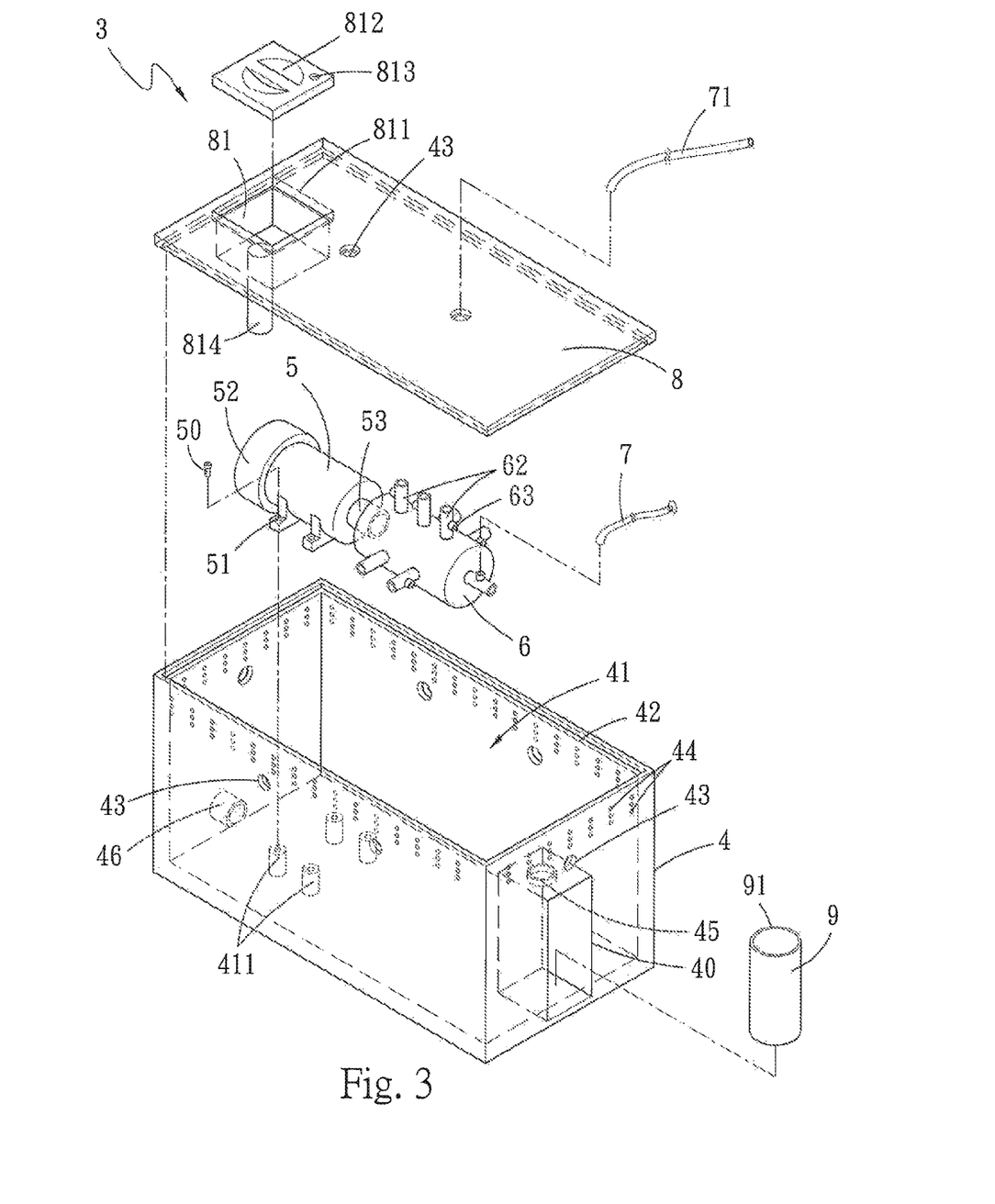
FIG. 3 is a perspective exploded view schematically showing an air cleaning device using water as a filter according to one embodiment of the present invention.
Figure 4:
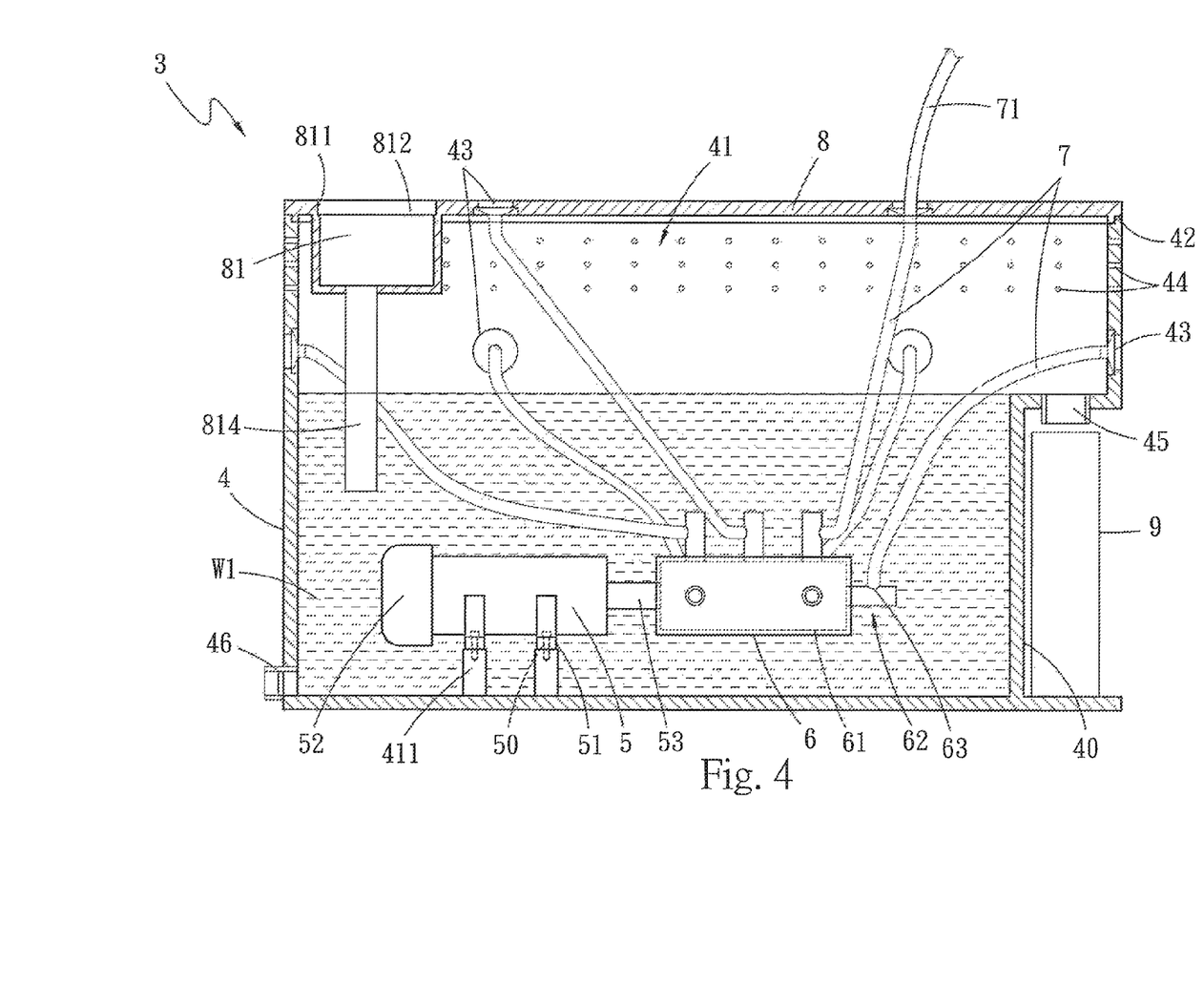
FIG. 4 is a sectional view schematically showing an air cleaning device using water as a filter according to one embodiment of the present invention.

Refer to FIG. 3 and FIG. 4. The air cleaning device 3 using water as a filter of the present invention comprises a water tank 4, a water pump 5, a pressure equalizer 6, a plurality of air-inhale tubes 7, at least one extension tube 71, a cover 8, and an overflow container 9.

The water tank 4 has an accommodation space 41 for containing water W1. A plurality of supports 411 protrude from the bottom of the accommodation space 41. The top of the accommodation space 41 of the water tank 4 has an opening 42. The upper region of the water tank 4 has a plurality of air inlets 43 and a plurality of air outlets 44, which interconnect with the accommodation space 41. A portion of one side of the water tank 4 is concaved inward to form a recess 40. A drainage hole 45 is formed on a position above the recess 40 but below the air inlets 43 and the air outlets 44. A water release valve 46 is disposed in the lower edge of one side of the water tank 4 and interconnects with the accommodation space 41.

The water pump 5 is disposed in a lower portion of the accommodation space 41. The water pump 5 has a plurality of fixing members 51 corresponding to the supports 411 of the accommodation space 41. A plurality of fixing elements 50, such as screws, is used to fasten the fixing members 51 of the water pump 5 to the supports 411 of the accommodation space 41. The water pump 5 has a suction end 52 far away from the drainage hole 45 and an output end 53 near the drainage hole 45.

Figure 5:
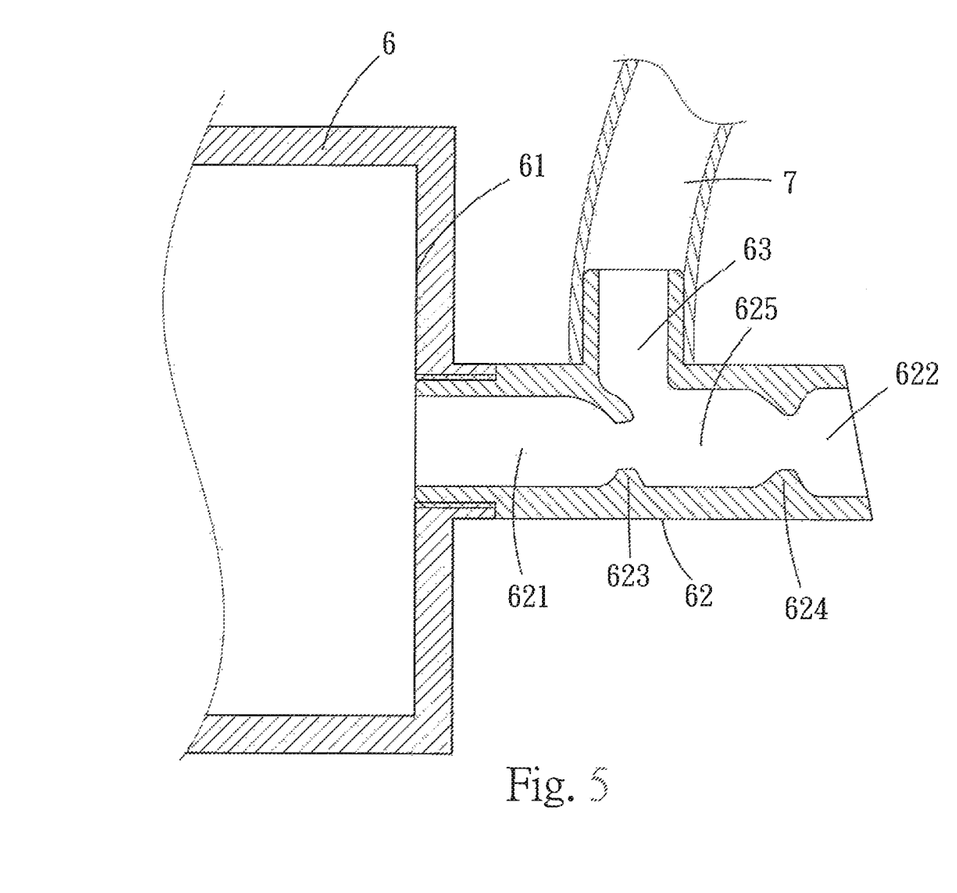
FIG. 5 is a sectional view schematically showing a jet pipe according to one embodiment of the present invention.

The pressure equalizer 6 is connected with the water pump 5. The pressure equalizer 6 has a pressure equalization chamber 61. A plurality of jet pipes 62 is disposed on the surface of the pressure equalizer 6. The pressure equalization chamber 61 respectively interconnects with the output end 53 of the water pump 5 and the jet pipes 62. Refer to FIG. 5. The jet pipe 62 has a front end 621 and a rear end 622. The jet pipe 62 between the front end 621 and the rear end 622 is gradually shrunk to form a first convergent hole 623 and a second convergent hole 624. The section of the jet pipe 62, which is between the first convergent hole 623 and the second convergent hole 624, functions as a water-air mixing space 625. The front end 621 of the jet pipe 62 interconnects with the pressure equalization chamber 61; the rear end 622 of the jet pipe 62 is an exhaust hole of water W1. An air-inhale hole 63 is disposed on one side of the water-air mixing space 625 of each jet pipe 62 and interconnects with the water-air mixing space 625.

Figure 6:
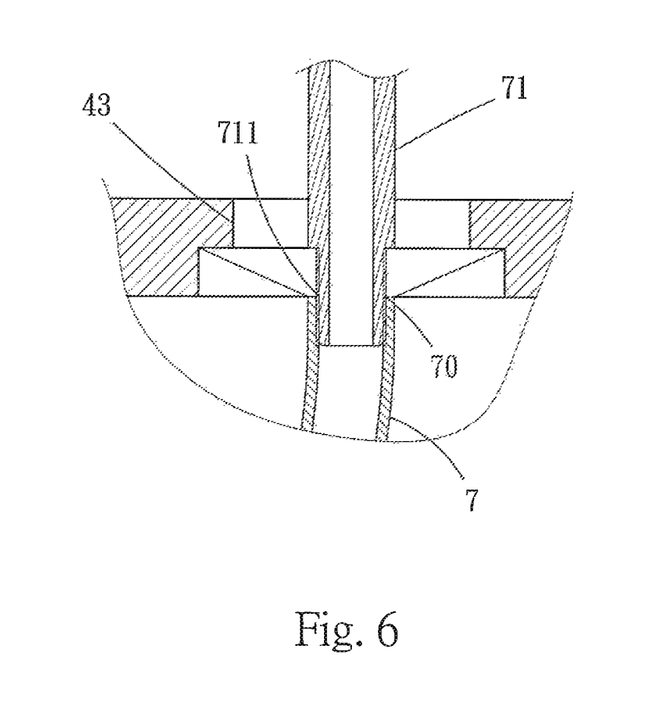
FIG. 6 is a locally-enlarged view schematically showing the connection of an extension tube and an air inlet according to one embodiment of the present invention.

Two ends of each air-inhale tube 7 respectively corresponding to one air inlet 43 and the air-inhale hole 63 of one jet pipe 62 and respectively interconnect with the air inlet 43 and the air-inhale hole 63. Refer to FIG. 6. One end of each air-inhale tube 7 has an inner thread 70. One end of each extension tube 71 has an outer thread 711. The outer thread 711 of the extension tube 71 is inserted into the air inlet 43 from exterior and screwed into the inner thread 70 of the air-inhale tube 7.

The cover 8 corresponds to the opening 42 and hoods the top of the water tank 4. The cover 8 has a plurality of air inlets 43 identical to those of the water tank 4. The cover 8 also has a water storage tank 81 disposed far away from the drainage hole 45. The air inlets 43 respectively interconnect with the air-inhale holes 63 of the jet pipes 62 through the air-inhale tubes 7. The water storage tank 81 has a water storage opening 811 at the top thereof and an external lid 812 disposed above the water storage opening 811. The external lid 812 has an air vent 813 penetrating the external lid 812. The bottom of the water storage tank 81 interconnects with a water-input pipe 814 corresponding to the suction end 52 of the water pump 5 and extending into the water W1.

The overflow container 9 is disposed inside the recess 40 of the water tank 4 and has an overflow opening 91 corresponding to the drainage hole 45.

Figure 7:
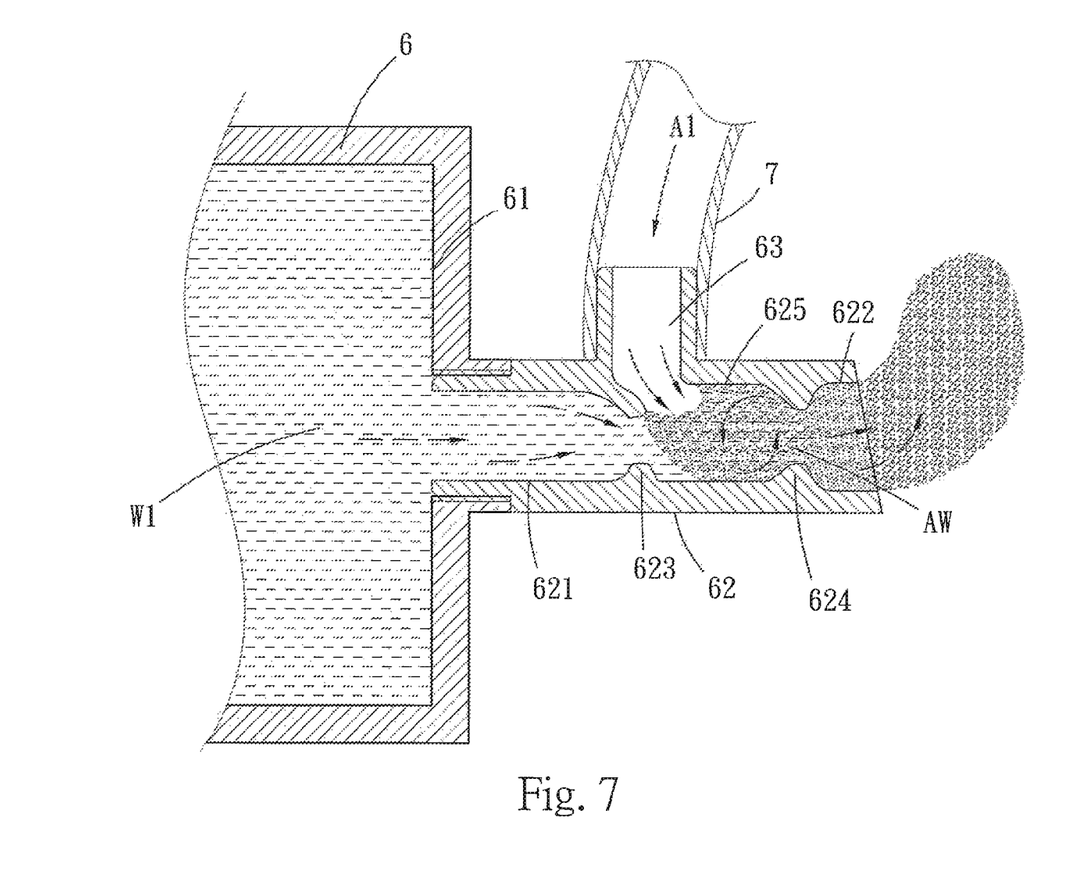
FIG. 7 is a diagram schematically showing the mixing of water and air in the jet pipe according to one embodiment of the present invention.

The cover 8 hoods the water tank 4. The air inlets 43 of the water tank 4 and the air inlets 43 of the cover 8 respectively interconnect with the air-inhale holes 63 of the jet pipes 62 through the air-inhale tubes 7. Refer to FIG. 4 and FIG. 7. In one embodiment, the highest level of the water W3 in the accommodation space 41 is flush with the drainage hole 45; the water pump 5 is turned on to suck the water W1 from the suction end 52 and output high-pressure water W1 to the pressure equalizer 6 through the output end 53. The water W1 is pressure-equalized in the pressure equalization chamber 61 and ejected from the jet pipes 62. The water W1 is processed by the jet pipes 62 according to a jet theory. While the water W1 flows through the first convergent hole 623 from the front end 621, the reduction of the sectional area of the first convergent hole 623 pressurizes the water W1 into the water-air mixing space 625, whereby a negative pressure, i.e. a sucking force, is generated in the air-inhale hole 63 on the water-air mixing space 625. The sucking force sucks the air A1 outside the air inlet 43 into the water-air mixing space 625 through the air-inhale tube 7 and the air-inhale hole 63. The air A1 containing bacteria, suspended particulates and humidity is mixed with the water W1 in the water-air mixing space 625 to generate aerated water AW. The aerated water AW is pressurized by the reduction of the sectional area of the second convergent hole 624 and ejected into the accommodation space 41.

Figure 8:
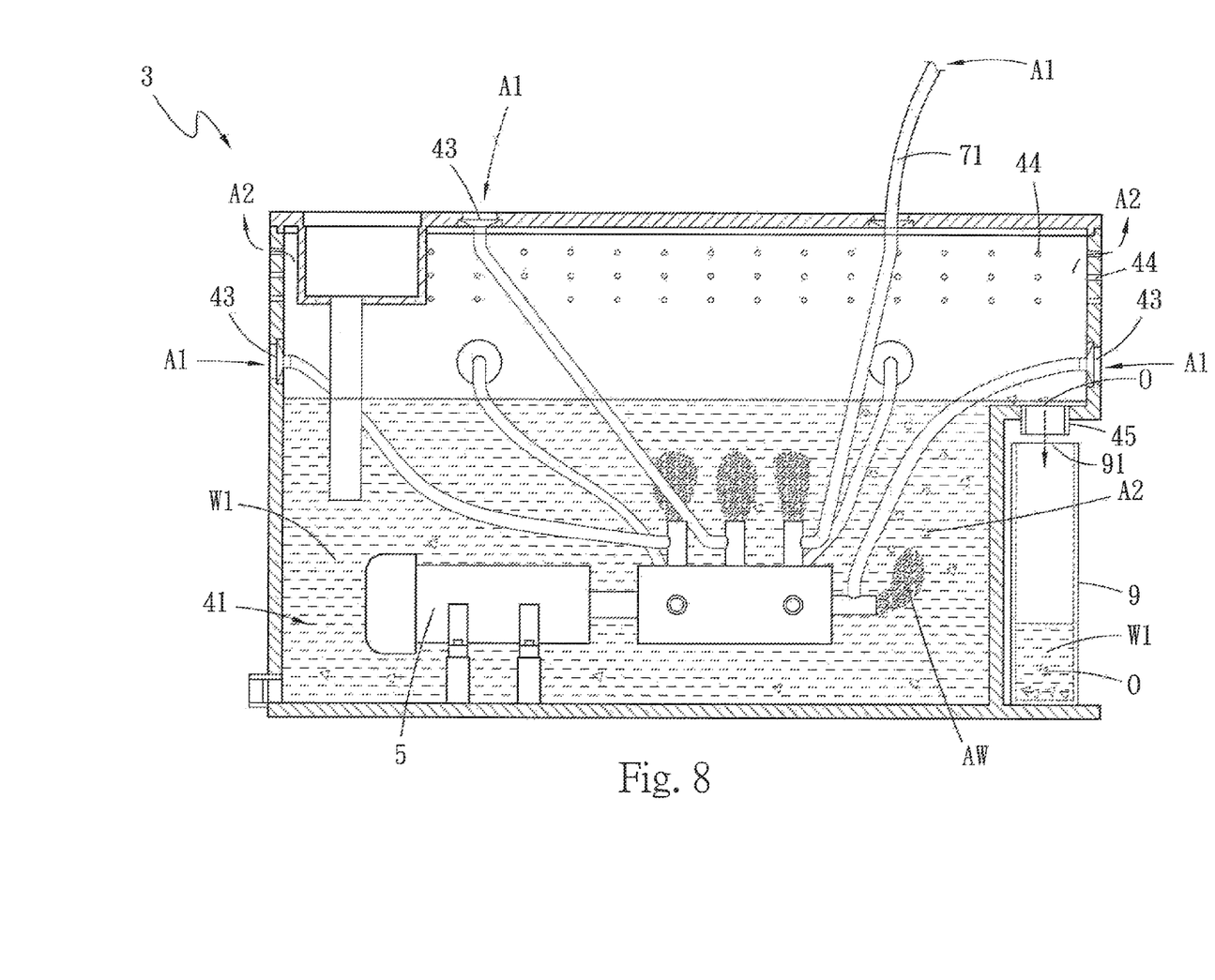
FIG. 8 is a diagram schematically showing that the water in the accommodation space overflows out of the drainage hole according to one embodiment of the present invention.

Refer to FIG. 7 and FIG. 8. The air cleaning device 3 of the present invention sucks the ambient air A1 through the air inlet 43, the air-inhale tubes 7 and the extension tube 71. The air A1 violently collides with the water W1, atomized in the water-air mixing space 625, releasing clean air A2 containing natural anions, and mixed with the water W1 to form aerated water AW. The clean air A1 is released from the air outlets 44 and mixed convectionally with the ambient air A1 containing odors, smoke particles, dust and bacteria, whereby the ambient air A1 is diluted by the clean air A2. Thereby, the quality of the air A1 is improved, and the discomfort caused by polluted air is decreased. The aerated water AW, which is generated by violent collision of the air A1 and the water W1 in water-air mixing space 625, is ejected into the accommodation space 41, whereby the bacteria and suspended particulates in the air A1 are irreversibly absorbed by the water W1, and whereby is inhibited the spread of infectious diseases. The carbon dioxide in the air A1 is partially dissolved in the water W1, whereby is achieved a carbon reduction effect. The oily vapor and some foreign matters O carried by the air A1, such as larger particles, are less likely to mix with the water W1. The cyclic suction and exhaust of the water pump 5 generates turbulence in the water W1 of the accommodation space 41. The turbulence makes the lighter foreign matters O float on the surface of the water W1 and overflow together with the water W1 into the overflow container 9 through the overflow opening 91.

Figure 9:
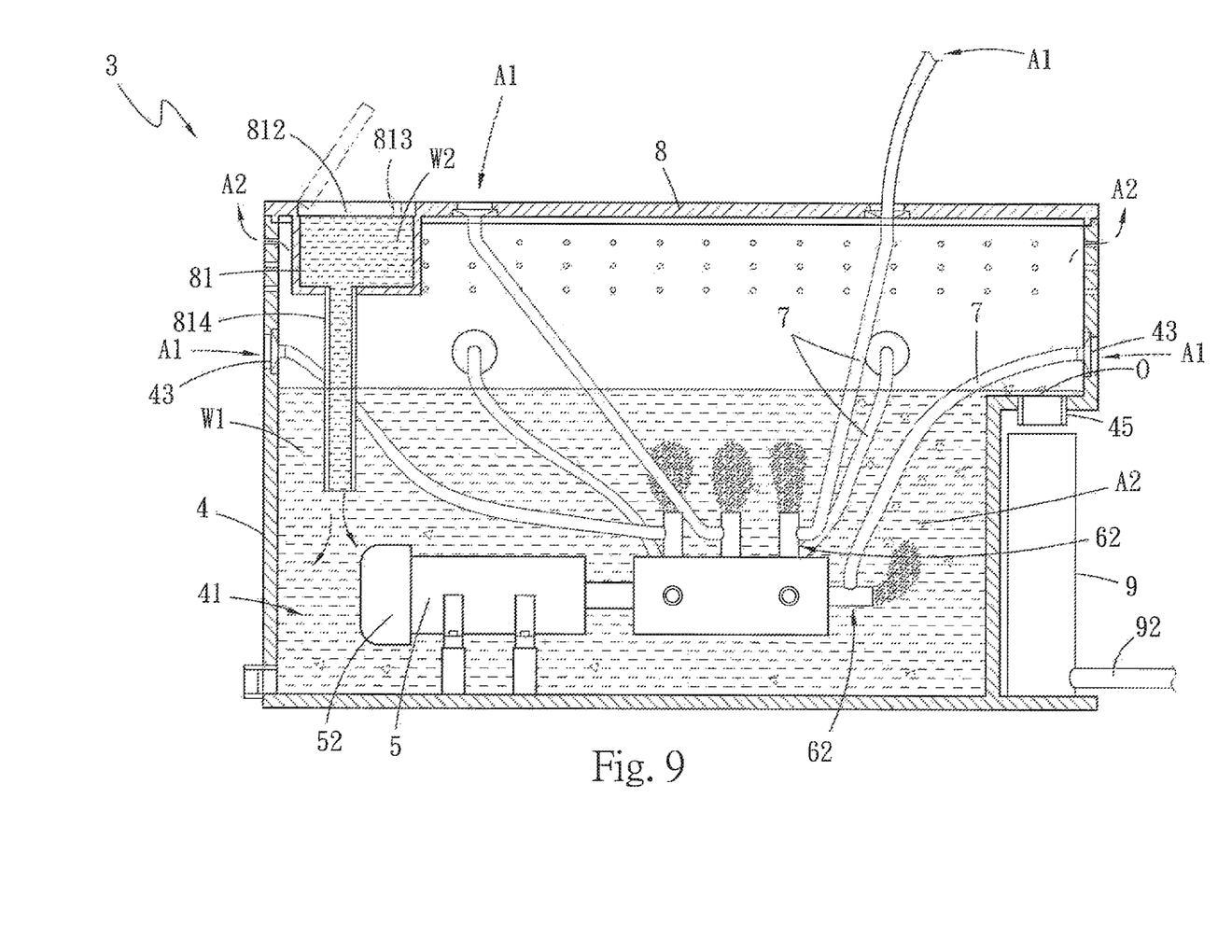
FIG. 9 is a diagram schematically showing that the water storage tank replenishes the accommodation space with clean water according to one embodiment of the present invention.

The air cleaning device of the present invention has the following advantages:

1. In application, the external lid is opened for resupplying clean water. Refer to FIG. 9. The air vent makes the hydraulic pressure of the clean water in the water storage tank identical to the hydraulic pressure of the water in the accommodation space. While the water in the accommodation space overflows through the drainage hole and has a drop in hydraulic pressure, the hydraulic pressure drop makes the clean water in the water storage tank flow through the water-input pipe to replenish the accommodation space. The clean water flowing out of the water-input pipe is directly sucked by the suction end of the water pump and then circulated in the accommodation space. In the present invention, a drainage pipe is connected with the bottom of the overflow container or directly connected with the drainage hole. In the embodiment shown in FIG. 9, the drainage pipe is connected with the bottom of the overflow container for draining off the water carrying the foreign matters. Therefore, the air cleaning device of the present invention can automatically replenish the accommodation space with the clean water lest the water carrying the foreign matters repeatedly circulate in the accommodation space and affect the air cleaning effect. Thus, the water in the accommodation space is always maintained at sufficient cleanness while filtering the air. Therefore, the air cleaning device has a better air cleaning effect.

2. The clean water in the water storage tank can be common clear water or antiseptic water, such as saline water or medicinal water, which is cheap, easily acquired, and environment-friendly.

3. The water pump can be a common pump or a submersible pump, but the latter is a preferred choice. The embodiments described in the specification use a submersible pump for exemplification. As a submersible pump operates underwater, it is always being cooled by water and less likely to overheat, burn, or explode in long-term usage. Further, underwater operation can reduce the noise emitted to the air by the pump. Furthermore, as the water pump is arranged at an elevated position in the accommodation space, it can suck the water from a wider area.

4. The jet pipes of the present invention use the air-inhale tubes and the air inlets on the water tank and the cover to inhale the air of a wider space from multiple directions. Thereby, the clean air extensively convects and exchanges with the air to achieve a high substitution rate of the air.

5. The function of the air cleaning device of the present invention would not be affected by a blocked or damaged jet pipe because the other jet pipes are still working normally.

Figure 10:
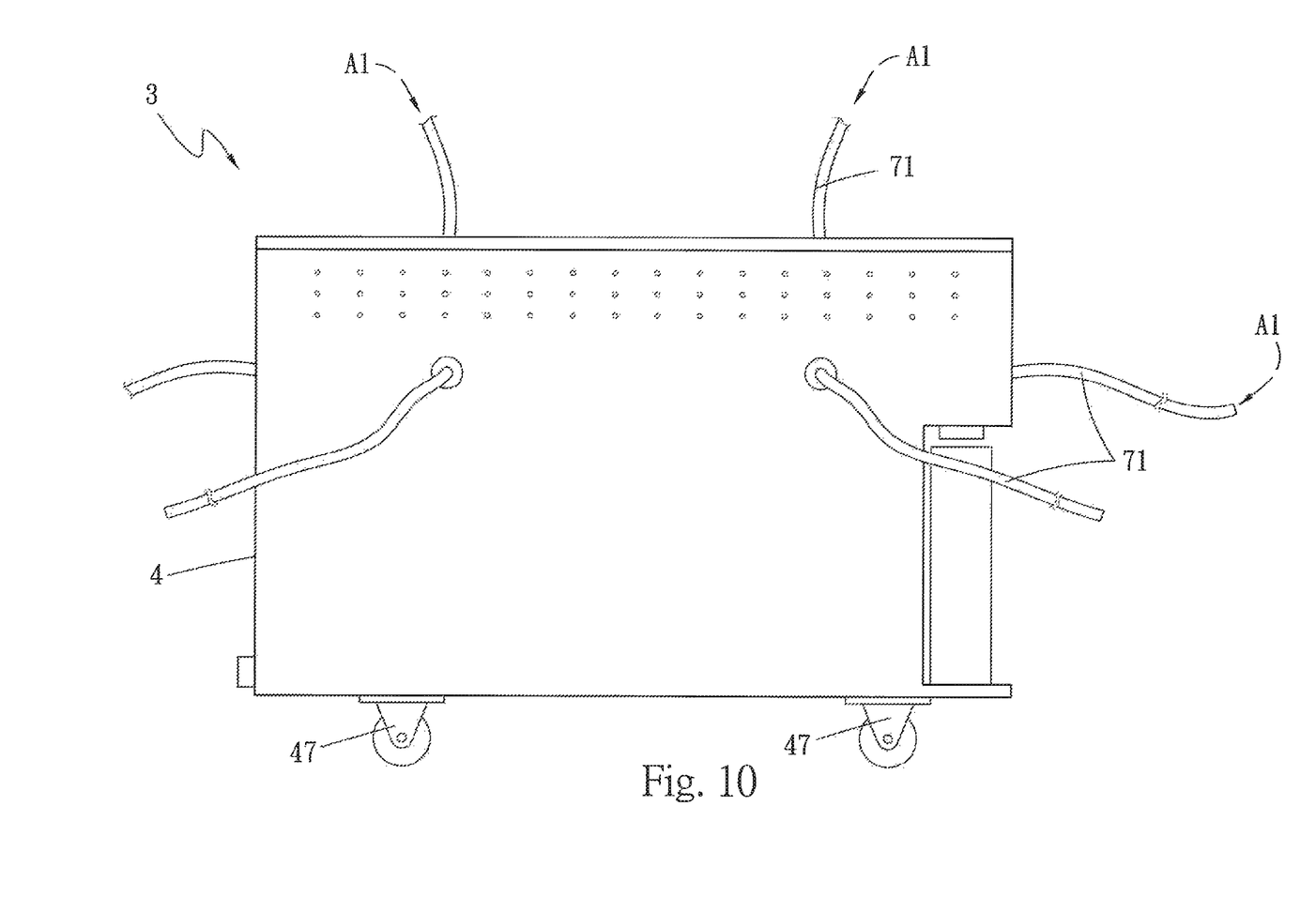
FIG. 10 is a diagram schematically showing an air cleaning device using water as a filter equipped with a plurality of rollers and a plurality of extension tubes according to one embodiment of the present invention.

6. The present invention equips a plurality of rollers in lower regions of the water tank of the air cleaning device, as shown in FIG. 10. Thereby, the air cleaning device can be moved to anywhere anytime to clean the air of any place. The extension tube of the air cleaning device can function like a dust collector to intensively suck dust and the air of a special location. While applied to a bathroom, the extension tube can be used to absorb the humidity in the air and the carbon monoxide generated by incomplete combustion of fuel gas, whereby is reduced the risk of carbon monoxide intoxication. Further, the extension tube can be used to remove the water accumulated on or spilt to the ground lest the water causes someone to slip, whereby the environmental safety is improved. The air cleaning device may have a plurality of extension tubes to meet the requirement of a special situation, such as a hospital. The extension tubes may be extended to a wide area to absorb the air therefrom, whereby to increase the substitution rate of the air and reduce the infection rate of patients.

What is claimed is:

1. An air cleaning device using water as a filter, comprising:
    a water tank comprising an accommodation space for containing water, wherein a top of the accommodation space includes an opening, and wherein an upper rim of the water tank includes a plurality of air inlets and a plurality of air outlets, which interconnect with the accommodation space, and wherein a drainage hole interconnecting with the accommodation space is formed on an upper position of the water tank, which is below the air inlets and the air outlets;

a water pump disposed in a lower portion of the accommodation space;

a pressure equalizer connected with the water pump and including a pressure equalization chamber, wherein a plurality of jet pipes are disposed on a surface of the pressure equalizer, and wherein the pressure equalization chamber respectively interconnects with an interior of the water pump and the jet pipes;

a plurality of air-inhale tubes, wherein two ends of each air-inhale tube respectively interconnect with one air inlet and one jet pipe;

a cover corresponding to the opening, hooding a top of the water tank, including the plurality of air inlets, and also including a water storage tank, wherein the plurality of air inlets respectively interconnect with the jet pipes through the air-inhale tubes, and wherein a bottom of the water storage tank is connected with a water-input pipe extending into the water of the accommodation space; and an overflow container disposed corresponding to the drainage hole and receiving the water overflowing out of the drainage hole.

2. The air cleaning device using water as a filter according to claim 1 further comprising at least one extension tube disposed in an exterior of one of the plurality of air inlets.

3. The air cleaning device using water as a filter according to claim 2, wherein one end of the air-inhale tube, which is connected with one of the plurality of air inlets, includes an inner thread thereinside, and wherein one end of the extension tube includes an outer thread, and wherein the extension tube is connected with the air-inhale tube via screwing the outer thread into the inner thread.

4. The air cleaning device using water as a filter according to claim 1, wherein a plurality of supports protrude from a bottom of the accommodation space, connected with the water pump to secure the water pump and elevate the water pump to a higher level.

5. The air cleaning device using water as a filter according to claim 1, wherein the water storage tank includes a water storage opening at a top thereof and an external lid disposed above the water storage opening to hood the water storage opening, and wherein the external lid includes an air vent penetrating the external lid.

6. The air cleaning device using water as a filter according to claim 1, wherein a portion of one side of the water tank is concaved inward to form a recess, and wherein the drainage hole is formed on a position above the recess, and wherein the overflow container is disposed inside the recess, and wherein an overflow opening is formed on a top of the overflow container and corresponding to the drainage hole.

7. The air cleaning device using water as a filter according to claim 1, wherein a bottom of the overflow container is connected with a drainage pipe interconnecting with the overflow container.

8. The air cleaning device using water as a filter according to claim 1, wherein a water release valve is disposed in a lower edge of one side of the water tank and interconnects with a lower region of the accommodation space.

9. The air cleaning device using water as a filter according to claim 1, wherein a plurality of rollers is installed in lower regions of the water tank.

* * * * *